US012802840B2

(12) United States Patent
Johanson et al.

(10) Patent No.: US 12,802,840 B2
(45) Date of Patent: Nov. 17, 2026

(54) POWER CABLE WITH A TIN OR TIN ALLOY WATER BARRIER

(71) Applicant: NEXANS, Courbevoie (FR)

(72) Inventors: Audun Johanson, Oslo (NO); Sigurd Schawlann, Son (NO); Massimiliano Mauri, Borgenhaugen (NO); Simon Jorgensen, Sellebakk (NO)

(73) Assignee: NEXANS, Courbevoie (FR)

( * ) Notice: Subject to any disclaimer, the term of this patent is extended or adjusted under 35 U.S.C. 154(b) by 260 days.

(21) Appl. No.: 18/131,868

(22) Filed: Apr. 7, 2023

(65) Prior Publication Data

US 2024/0120131 A1 Apr. 11, 2024

(30) Foreign Application Priority Data

Apr. 12, 2022 (EP) .................................... 22305525

(51) Int. Cl.

| | |
|---|---|
| ***H01B 7/28*** | (2006.01) |
| ***H01B 1/02*** | (2006.01) |
| ***H01B 7/282*** | (2006.01) |
| ***H01B 9/00*** | (2006.01) |
| *H01B 7/14* | (2006.01) |

(52) U.S. Cl.

CPC ............. *H01B 7/2825* (2013.01); *H01B 1/02* (2013.01); *H01B 9/00* (2013.01); *H01B 7/14* (2013.01)

(58) Field of Classification Search

CPC ... H01B 1/02; H01B 1/04; H01B 1/06; H01B 7/282; H01B 7/02; H01B 7/04; H01B 7/06; H01B 7/0861; H01B 7/1875; H01B 7/14; H01B 7/18; H01B 7/28; H01B 9/02; H01B 9/04; H01B 9/06; H01B 11/085; H01B 11/1033; H01B 11/1016; B32B 37/24; B32B 37/203; B32B 15/20; B32B 15/08; B32B 27/281; B32B 2037/243

USPC ............. 174/36, 106 SC, 119 R, 119 C, 107; 156/60, 84, 244, 11, 308.6, 308.8

See application file for complete search history.

(56) References Cited

U.S. PATENT DOCUMENTS

| | | | | | |
|---|---|---|---|---|---|
| 3,602,636 | A * | 8/1971 | Evans | H01B 7/295 | 174/110 AR |
| 3,745,233 | A * | 7/1973 | Lania | B32B 27/00 | 427/118 |
| 4,256,921 | A * | 3/1981 | Bahder | H01B 9/02 | 174/102 D |
| 4,454,379 | A * | 6/1984 | Cleveland | H01B 7/2825 | 174/106 SC |
| 4,675,474 | A * | 6/1987 | Neuroth | H01B 7/182 | 174/120 AR |

(Continued)

FOREIGN PATENT DOCUMENTS

| | | | |
|---|---|---|---|
| CN | 216 119 656 | 3/2022 | |
| EP | 2312591 A1 * | 4/2011 | H01B 1/12 |

OTHER PUBLICATIONS

European Search Report dated Sep. 16, 2022.

*Primary Examiner* — William H. Mayo, III

(74) *Attorney, Agent, or Firm* — CANTOR COLBURN LLP

(57) ABSTRACT

A power cable for submarine or land applications including a cable core and a metallic water barrier sheath arranged radially outside the cable core, where the cable core has a metallic layer made of a tin alloy and where the water barrier sheath is an extruded metal sheath or a longitudinally welded sheath.

21 Claims, 1 Drawing Sheet

(56) References Cited

U.S. PATENT DOCUMENTS

| | | | | | |
|---|---|---|---|---|---|
| 4,703,134 | A * | 10/1987 | Uematsu | H01B 7/285 | 174/106 SC |
| 4,725,693 | A * | 2/1988 | Hirsch | B32B 7/14 | 174/106 SC |
| 5,310,964 | A * | 5/1994 | Roberts | H01B 7/295 | 174/106 SC |
| 6,215,070 | B1 * | 4/2001 | King | H01B 7/2825 | 174/106 R |
| 9,006,574 | B2 * | 4/2015 | Kagoura | H01B 7/2825 | 428/179 |
| 9,029,705 | B2 * | 5/2015 | Furuheim | H01B 7/28 | 174/102 R |
| 9,058,917 | B2 * | 6/2015 | Koelblin | H01B 7/2825 | |
| 2011/0048765 | A1 * | 3/2011 | Eggertsen | H01B 7/14 | 156/244.11 |
| 2019/0009512 | A1 * | 1/2019 | Kagawa | B32B 37/203 | |
| 2020/0126687 | A1 * | 4/2020 | Bareggi | H01B 7/0225 | |
| 2021/0210253 | A1 | 7/2021 | Cristofani et al. | | |

* cited by examiner

POWER CABLE WITH A TIN OR TIN ALLOY WATER BARRIER

RELATED APPLICATION

This application claims the benefit of priority from European Patent Application No. 22 305 525.2, filed on Apr. 12, 2022, the entirety of which is incorporated by reference.

FIELD OF THE INVENTION

The present invention relates to metallic water barrier materials for power cables and in particular metallic water barrier materials for use in high voltage cables for both land and submarine applications.

BACKGROUND

Power cables for intermediate to high voltage ratings typically comprise an inner conductor and several layers provided radially outside of the inner conductor, such as an electric insulation layer, a semiconductive shielding layer, an armouring layer and an outer sheathing.

Power cables commonly comprise a sheath layer consisting of lead to be used as a radial water barrier. This relates to submarine power cables but is also relevant for other cables subjected to potential humid environment. Water and humidity are detrimental to electrical insulating materials for all power cables conducting electricity at medium and high voltages.

Conventional cables often use extruded lead as radial water barrier. Lead is a metal applicable as radial water barrier because of its relatively low melting point, the metal is soft and has a high malleability. However, its toxicity and negative environmental effects encourage the industry to find alternative solutions.

As mentioned above lead is not desired due to environmental issues. Hence, one object of the present invention is to provide an alternative water barrier wherein the water barrier is made of tin or a tin alloy.

SUMMARY OF THE INVENTION

The present inventors have solved the above-mentioned need by providing in a first aspect a power cable comprising

- at least one cable core comprising an electrical conductor and an electrically insulating layer arranged radially outside the electrical conductor, and
- a water barrier sheath arranged radially outside of the cable core, wherein the water barrier sheath comprises a metal layer, wherein the metal layer is either tin, Sn, or a Sn alloy.

Preferably, the metal layer is either tin or Sn alloy. Alternatively, the metal layer may be Sn.

According to a preferred embodiment of the first aspect, the power cable comprises:

- at least one cable core comprising an electrical conductor and an electrically insulating layer arranged radially outside the electrical conductor, and
- a water barrier sheath arranged radially outside the cable core, wherein the water barrier sheath comprises a metal layer, wherein the metal layer is either tin, Sn, or a Sn alloy
- and wherein: the water barrier sheath is an extruded metal sheath or a longitudinally welded sheath.

In one embodiment of the first aspect the power cable is a subsea cable or a land cable.

In one embodiment of the first aspect the power cable is a high voltage power cable.

In one embodiment of the first aspect the water barrier sheath is an extruded metal sheath.

In one embodiment of the first aspect the water barrier sheath is a longitudinally welded sheath.

In one embodiment of the first aspect the water barrier sheath is a laminated structure comprising a metal layer between at least two insulating or non-insulating polymeric layers.

In one embodiment of the first aspect the water barrier sheath is applied to parts of the power cable or the whole length of the cable.

In one embodiment of the first aspect the power cable comprises at least one polymeric layer radially outside the water barrier sheath.

In one embodiment of the first aspect the polymeric layer is fastened to the water barrier sheath by an adhesive layer to prevent movement between the polymeric layer and the water barrier sheath, or the water barrier sheath and the polymeric layer are not fastened together to allow movement between the polymeric layer and the water barrier sheath.

In one embodiment of the first aspect the power cable comprises intermediate layer arranged radially between the electrically insulating layer and the water barrier sheath, wherein the intermediate layer comprises a material having a bulk modulus higher than 1 GPa.

In one embodiment of the first aspect the metal layer of the water barrier sheath is selected from commercially pure Sn, Sn—Cu and Sn—Sb.

In one embodiment of the first aspect the metal layer of the water barrier sheath is selected from:

- commercially pure Sn material that has a Sn content of at least 99.5% by weight and a content of unavoidable impurities from 0 to 0.5% by weight based on the total weight of the pure Sn material, and wherein the content of Sn and unavoidable impurities sum up to 100% by weight;
- a Sn alloy that has a Sn content from 97%-99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; and
- a Sn alloy that has a Sn content from 93%-96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

In a second aspect there is provided a method of manufacturing a power cable comprising the steps of:

- providing a cable core comprising an electrical conductor and an electrically insulating layer arranged radially outside the electrical conductor, and
- arranging a water barrier layer comprising a metal layer radially around the cable core, wherein the metal layer is either tin, Sn, or a Sn alloy forming a sheath.

In one embodiment of the second aspect the step of arranging the water barrier layer forming a sheath includes extruding the metal layer, application of a longitudinally welded sheath. or application of a longitudinally or helically folded laminated structure.

In a third aspect there is provided a power cable comprising

- at least one cable core comprising an electrical conductor and an electrically insulating layer arranged radially outside the electrical conductor, and
- a water barrier sheath arranged radially outside of the cable core, wherein the water barrier sheath comprises a metal layer, wherein the metal layer is either tin, Sn, or a Sn alloy, preferably tin or a Sn Alloy, and wherein the water barrier sheath is a laminated structure comprising a metal layer between at least two insulating or non-insulating polymeric layers.

In one embodiment of the third aspect the power cable is a subsea cable or a land cable.

In one embodiment of the third aspect the power cable is a high voltage power cable.

In one embodiment of the third aspect the water barrier sheath is applied to parts of the power cable or the whole length of the cable.

In one embodiment of the third aspect the power cable comprises at least one polymeric layer radially outside the water barrier sheath.

In one embodiment of the third aspect the polymeric layer is fastened to the water barrier sheath by an adhesive layer to prevent movement between the polymeric layer and the water barrier sheath, or the water barrier sheath and the polymeric layer are not fastened together to allow movement between the polymeric layer and the water barrier sheath.

In one embodiment of the third aspect the power cable comprises an intermediate layer arranged radially between the electrically insulating layer and the water barrier sheath, wherein the intermediate layer comprises a material having a bulk modulus higher than 1 GPa.

In one embodiment of the third aspect the metal layer of the water barrier sheath is tin or a Sn alloy selected from Sn—Cu and Sn—Sb.

In one embodiment of the third aspect the metal layer of the water barrier sheath is selected from:

- a Sn alloy that has a Sn content from 97%-99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; and
- a Sn alloy that has a Sn content from 93%-96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

In a fourth aspect there is provided a method of manufacturing a power cable comprising the steps of:

- providing a cable core comprising an electrical conductor and an electrically insulating layer arranged radially outside the electrical conductor, and
- arranging a water barrier layer comprising a metal layer radially around the cable core, wherein the metal layer is a Sn—Cu or Sn—Sb alloy forming a sheath.

In one embodiment of the fourth aspect the step of arranging the water barrier layer forming a sheath includes extruding the metal layer and application of a longitudinally or helically folded laminated structure.

DETAILED DESCRIPTION

Figure 1:
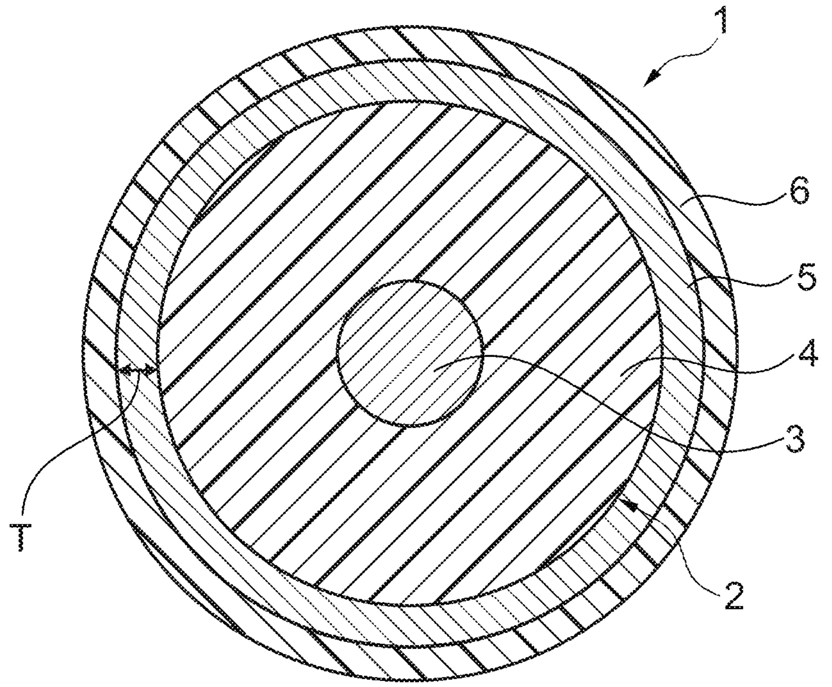
FIG. 1 schematically illustrates one embodiment of the invention, where an example of a power cable cross section is shown comprising one cable core.

In the following description, various examples and embodiments of the invention are set forth in order to provide the skilled person with a more thorough understanding of the invention. The specific details described in the context of the various embodiments and with reference to the attached drawings are not intended to be construed as limitations.

Where a numerical limit or range is stated herein, the endpoints are included. Also, all values and sub ranges within a numerical limit or range are specifically included as if explicitly written out.

As mentioned above, the present invention provides a water barrier sheathing for cables for land or submarine applications wherein the water barrier sheath is made of tin or a tin alloy.

The water barrier sheathing may be either

- a longitudinally welded sheath (LWS) of tin (Sn) or a Sn-alloy,
- an extruded metal sheath made of Sn or a Sn alloy,
- laminate structure comprising a metal layer made of Sn or a Sn alloy between at least two layers of insulating or non-insulating polymers.

The water barrier sheathing is preferably either

- a longitudinally welded sheath (LWS) of tin (Sn) or a Sn-alloy,
- an extruded metal sheath made of Sn or a Sn alloy.

Alternatively, the barrier sheathing may be a laminate structure comprising a metal layer made of a Sn alloy between at least two layers of insulating or non-insulating polymers.

Alternatively, the barrier sheathing may be a laminate structure comprising a metal layer made of a Sn alloy between at least two layers of insulating or non-insulating polymers.

DEFINITIONS

Percentage solution may refer to: Mass fraction (chemistry) (or "% w/w" or "wt. %."), for percent mass.

The term "high voltage" as applied herein refers to a voltage above 36 kV such as in the range 50 kV to 800 kV.

Water Barrier Made of Tin or a Tin Alloy

Similar to lead, tin is a soft, malleable and highly ductile metal with a relatively low melting temperature of around 232° C.

It is well known that tin and its alloys can have different crystal structures, wherein the alpha-tin crystal structure has a face-centred diamond-cubic structure and beta-tin has a body-centred tetragonal crystal structure. In cold conditions beta-tin can transform spontaneously into alpha-tin, a phenomenon known as "tin pest" or "tin disease". Commercially pure grades of tin with a tin content of at least 99.5% resist transformation because of the inhibitory effect of small amounts of bismuth, antimony, lead and silver present as unavoidable impurities. Alloying element such as copper (Cu) and antimony (Sb) also increases the hardness of tin (Sn). Thus, the tin and tin alloys for use in a water barrier sheath are selected from commercially pure tin, a Sn—Cu alloy or a Sn—Sb alloy. Table 1 and 2 below depict further details and embodiments of the water barrier sheath materials.

TABLE 1

| Commercially pure tin | |
|---|---|
| Sn [wt %] | >=99.5 |
| Unavoidable impurities [wt %] | 0-0.5 |

TABLE 2

| | Alloy 1 | Alloy 2 |
|---|---|---|
| Sn [wt %] | 97-99.5 | 93-96 |
| Cu [wt %] | 0.5-2 | |
| Sb [wt %] | | 4-6 |
| Unavoidable impurities [wt %] | 0-1 | 0-1 |

It is noted that any percentage amount of a metal component in an alloy described herein is provided as a fraction of the weight of the metal per total weight of the alloy as a percentage, or [wt %].

It will be appreciated by a skilled person that, where a range of a percentage amount of a metal in an alloy is given, the amount of metal in that alloy may vary within that range, provided the total amount of all metals in that alloy adds up to a total of 100 wt %. It will also be appreciated that some metals and alloys may inevitably have very small quantities of impurities within them. These unavoidable impurities may be present since they are typically either too difficult or costly to remove when the metal or alloy is being produced. These impurities may be present in the range from 0.0001%, 0.001%, 0.005% or 0.01% to 0.1%, 0.5%, 1% (wt) based on the total weight of the alloy and wherein each impurity does not exceed 0.5% by weight based on the total weight of the alloy. It will be appreciated such impurities may be present in the metals and alloys of the present invention without affecting or departing from the scope of the invention and comprise the following substances bismuth, antimony, lead and silver.

The water barrier sheath material may be commercially pure Sn.

The water barrier sheath material may be a Sn-0.7Cu alloy.

The water barrier sheath material may be a Sn-5Sb alloy.

The Power Cable

Figure 2:
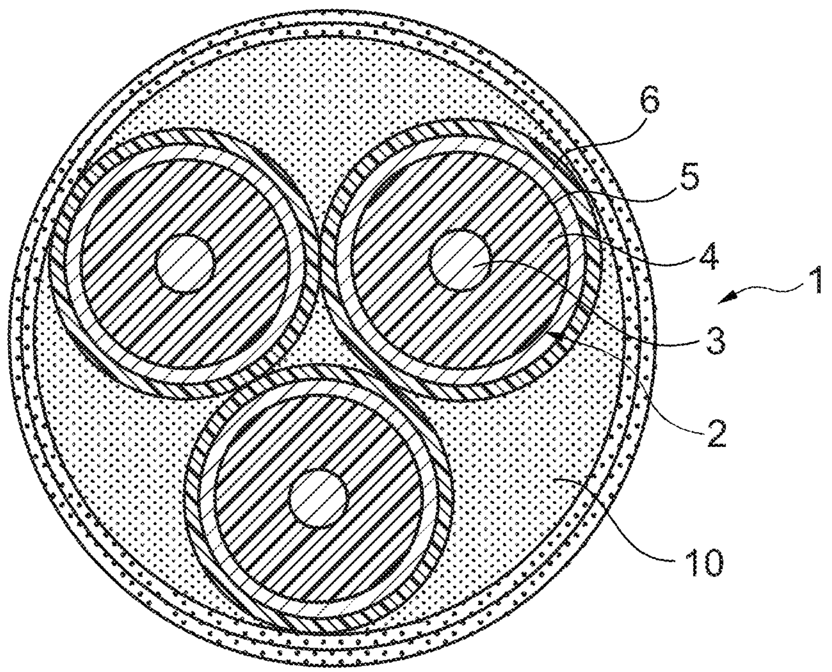
FIG. 2 schematically illustrates one embodiment of the invention, where an example of a power cable cross section comprising three cable cores is shown.

The invention is described further with reference to FIG. 1 and FIG. 2 of the drawings, which show a schematic of the cross-section of an embodiment of the cable of the invention.

FIG. 1 schematically illustrates an example of a cross section of a power cable 1, where the cable 1 is shown with one cable core 2. This invention is however not limited to a one-core cable, and the cable 1 may comprise two or any higher number of cores 2, as is deemed suitable for the cable's purposes. Accordingly, FIG. 2 illustrates an example of a power cable 1 cross section comprising three cable cores 2.

Each core 2 comprises an electrical conductor 3 arranged in the centre of the core 2, and an electrically insulating layer 4 arranged radially outside each conductor 3. Outside the first electrically insulating layer 4, though not illustrated in the figures, there may be arranged a layer of sealing material disposed between the electrically insulating layer 4 and a water barrier sheath 5. This sealing material swells upon contact with water thereby working as an extra redundancy measure to prevent ingress of moisture in case of a crack or other failure in the water barrier sheath 5.

It should be noted that the cable 1, and variations thereof, may comprise additional layers, or filling material 10 as exemplified in FIG. 2, arranged radially outside each conductor 3 or the at least one cable core 2, which will not be described further herein. These layers and materials may be arranged inside, in-between or outside the already mentioned layers herein, and may comprise for example additional insulating, semiconducting, conducting, shielding and armouring layers as is well known in the art.

A polymer layer 6 may be extruded radially outside the water barrier sheath 5. This process is not detailed further herein since this is a well-known process in the art and will be apparent to the person skilled in the art.

The polymeric layer 6 may be fastened to the water barrier sheath 5 by an adhesive layer to prevent movement between the polymeric layer 6 and the water barrier sheath 5.

Alternatively, the water barrier sheath 5 and the polymeric layer 6 are not fastened together to allow movement between the polymeric layer and the water barrier sheath 5.

In other aspects of the invention, one cable core 2 may be put together with several other cable cores, as is illustrated in FIG. 2.

Power cables for intermediate to high current capacities have typically one or more electric conductors at their core followed by electric insulation and shielding of the conductors, an inner sheathing protecting the core, an armouring layer, and an outer polymer sheathing. The conductors of power cables are typically made of either aluminium or copper. The conductor may either be a single strand surrounded by electric insulating and shielding layers, or a number of strands arranged into a bunt being surrounded by electric insulating and shielding layers.

These are the typical minimum of components required to make a functional power cable with comparable high electric power transferring capacity. However, a power cable may also comprise one or more additional components depending on the intended properties and functionalities of the power cable.

The water barrier sheath as applied herein refers to a sheath comprising a layer made of tin or a tin alloy and wherein the sheath is either an extruded metal sheath, a longitudinally welded metal sheath (LWS) or a laminated metal sheath comprising a metal layer laminated between at least two layers of insulating or non-insulating polymer layers.

In a further aspect the water barrier sheath 5 includes a longitudinally welded sheathing. In this aspect, the sheathing material, i.e., the material of the water barrier, may include an exogenous or autogenously welded Sn or Sn alloy. The sheathing may generally be manufactured by forming a precursor metal strip around the cable core welding the edges. The diameter of the welded sheath is thereby reduced by either drawing or rolling.

In another aspect, the water barrier sheath 5 includes an extruded Sn or Sn alloy sheath. In this aspect, the water barrier sheath may include a continuously extruded Sn or Sn alloy sheath from raw material. The sheathing diameter can be reduced after extrusion by drawing or rolling to remove spacings.

The rolling or drawing reduces the diameter of the water barrier sheath 5 in order to minimize the number and size of areas of gaps between the water barrier sheath 5 and the cable core 2.

Typically, the diameter of the water barrier sheath may be reduced between 1 mm to 5 mm in a controlled drawing or rolling process. Dependent on the efficacy of the drawing or rolling process, the size of the residual gaps may be reduced between 0.01 mm to 0.5 mm.

In another aspect, the water barrier sheath 5 includes a water barrier laminate, wherein the water barrier laminate 5 comprises a metal foil made of a tin-based material selected from a commercially pure Sn material or a Sn alloy laminated between at least two layers of insulating or non-insulating polymer constituting a final laminate that is insulating or non-insulating.

In another aspect, the water barrier sheath 5 includes a water barrier laminate, wherein the water barrier laminate 5 comprises a metal foil made of a tin-based material is a Sn alloy laminated between at least two layers of insulating or non-insulating polymer constituting a final laminate that is insulating or non-insulating.

Isolating and non-isolating polymer layers for use in the laminated structure are well known to a skilled person and examples of non-isolating polymer layers may be found in EP 2 437 272.

The term "metal foil" as used herein, refers to a metal layer of titanium or a titanium alloy which is placed in the middle of the laminate structure. The invention is not tied to use of any specific thickness of the metal foil. Any thickness T known to be suited for use in water barriers in power cables by the skilled person may be applied. In one example embodiment, the metal foil is a titanium or titanium alloy disclosed in tables 1 to 4 above. The thickness of the metal foil may be in one of the following ranges: from 10 to 250 μm, from 15 to 200 μm, from 20 to 150 μm, from 25 to 100 μm, and from 30 to 75 μm.

The laminated structure may be wrapped around the cable core 2 with at least some overlap between opposite edges of the laminate structure and wherein the opposite edges of the laminate structure are joined by thermal heating.

In a manufacturing process for a power cable the water barrier layer may be extruded forming an extruded sheath. Alternatively, the water barrier layer is applied in form a longitudinally welded sheath.

A typical manufacturing process for forming a power cable wherein the water barrier is a laminated structure is to arrange the laminated structure in form of a tape.

In this respect the tape may be a longitudinally or helically folded laminated structure.

Apart from the laminate structure being easy and cheap to produce, the tape form enables wrapping the laminate around the cable core with a tension to ensure a tight enclosure around the cable core and good contact between deposited laminate layers.

In another aspect the power cable may comprise an intermediate layer (not shown) that is arranged radially between the electrically insulating layer 4 and the water barrier sheath 5.

The intermediate layer is configured so as to absorb residual spacing between the cable core 2 and the water barrier sheath 5 when the power cable is subject to reduction through drawing or rolling. The power cable may be a subsea power cable. In this aspect the subsea power cable is also subject to compression from high water pressure due to the large water depth at which the power cable is located during use.

The intermediate layer arranged radially between the electrically insulating layer and the water barrier sheath, may comprise a material having a bulk modulus higher than 1 GPa.

Advantageously, the intermediate layer includes a material that has a bulk modulus within the range of 1 to 3 GPa in a temperature range of 0 to 90° C. The bulk modulus of a material is a measure of how resistant to compression the material is. It is defined as the ratio of the infinitesimal pressure increase to the resulting relative decrease of the volume. The bulk modulus may be measured as set out in the ASTM D6793-02(2012) standard. Further details of the intermediate layer are described in patent application EP3885120, in particular in paragraphs [0026] to [0040].

Having generally described this invention, a further understanding can be obtained by reference to the examples. The examples illustrate the properties and effects of certain aspects of the invention, and are provided herein for purposes of illustration only, and are not intended to be limiting.

EXAMPLE

Example 1—Tests Related to Formation of Tin Pest

Power cables may be subject to harsh environment such as drop in temperatures below 0° C. It is well known that tin may form tin pest at low temperatures in particular temperatures below −30 to −40° C.

In order to investigate the formation of tin pest, metal sheath samples made of SnSb5 (95% Sn and 5% Sb) and SnCu0.7 (99.3% Sn and 0.7% Cu) alloys have been stored at −29° C. for approximately 8 months.

The tests demonstrate that the formation of tin pest after 8 months storage at −29° C. is low

The invention claimed is:

1. A power cable comprising:

at least one cable core comprising an electrical conductor and an electrically insulating layer arranged radially outside the electrical conductor, and a water barrier sheath arranged radially outside the cable core, wherein the water barrier sheath comprises a metal layer, wherein the metal layer is an Sn alloy, wherein the water barrier sheath is an extruded metal sheath or a longitudinally welded metal sheath, and wherein the Sn alloy is an Sn—Cu alloy or an Sn—Sb alloy.

2. The power cable according to claim 1, wherein the power cable is a subsea cable or a land cable.

3. The power cable according to claim 1, wherein the power cable is a high voltage power cable.

4. The power cable according to claim 1, comprising at least one polymeric layer radially outside the water barrier sheath.

5. The power cable according to claim 4, wherein the polymeric layer is fastened to the water barrier sheath by an adhesive layer to prevent movement between the polymeric layer and the water barrier sheath, or wherein the water barrier sheath and the polymeric layer are not fastened together to allow movement between the polymeric sheath and the water barrier sheath.

6. The power cable according to claim 1, comprising an intermediate layer arranged radially between the electrically insulating layer and the water barrier sheath, wherein the intermediate layer comprises a material having a bulk modulus higher than 1 GPa.

7. The power cable according to claim 1 wherein the metal layer of the water barrier sheath is selected from: commercially pure Sn material that has a Sn content of at least 99.5% by weight and a content of unavoidable impurities from 0 to 0.5% by weight based on the total weight of the pure Sn material, and wherein the content of Sn and unavoidable impurities sum up to 100% by weight; a Sn alloy that has a Sn content from 97%-99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; and a Sn alloy that has a Sn content from 93%-96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

8. The power cable according to claim 7, wherein when said metal layer is made from an Sn alloy, the metal layer of the water barrier sheath is selected from:

an Sn alloy that has a Sn content form 97%-99.5% by weight, a Cu content from 0.5% to 2% by weight and a content of unavoidable impurities of 0 to 1% by wight based on the total weight of the Sn alloy, and where the content of Sn, Cu, and unavoidable impurities sum up to 100% by weight; and an Sn alloy that has a Sn content form 93%-96% by weight, a Sb content from 4% to 6% by weight and a content of unavoidable impurities of 0 to 1% by wight based on the total weight of the Sn alloy, and where the content of Sn, Cu, and unavoidable impurities sum up to 100% by weight.

9. The power cable according to claim 1, wherein the diameter of the water barrier sheath is reduced between 1 mm to 5 mm.

10. The power cable according to claim 1, wherein the water barrier sheath has a residual gap between 0.01 mm to 0.5 mm.

11. The power cable according to claim 1, wherein the power cable additionally comprises, outside the electrically insulating layer, a layer of a sealing material disposed between the electrically insulating layer and the water barrier sheath, wherein the sealing material swells upon contact with water.

12. The power cable according to claim 1, wherein the water barrier sheath consists of the metallic layer where main alloying elements are Sn—Cu or Sn—Sb.

13. The power cable according to claim 1, wherein the water barrier sheath is devoid of an overlap of opposing edges of the water barrier sheath along the longitudinal direction of the power cable.

14. A power cable comprising:

at least one cable core comprising an electrical conductor and an electrically insulating layer arranged radially outside the electrical conductor, a water barrier sheath arranged radially outside the cable core, wherein the water barrier sheath comprises a metal layer, wherein the metal layer is an Sn—Cu alloy or an Sn—Sb alloy, and wherein the water barrier sheath is a laminated structure comprising a metal layer between at least two insulating or non-insulating polymeric layers.

15. The power cable according to claim 14, wherein the power cable is a subsea cable or a land cable.

16. The power cable according to claim 14, wherein the power cable is a high voltage power cable.

17. The power cable according to claim 14, comprising at least one polymeric layer radially outside the water barrier sheath.

18. The power cable according to claim 17, wherein the polymeric layer is fastened to the water barrier sheath by an adhesive layer to prevent movement between the polymeric layer and the water barrier sheath, or wherein the water barrier sheath and the polymeric layer are not fastened together to allow movement between the polymeric sheath and the water barrier sheath.

19. The power cable according to claim 14, comprising an intermediate layer arranged radially between the electrically insulating layer and the water barrier sheath, wherein the intermediate layer comprises a material having a bulk modulus higher than 1 GPa.

20. The power cable according to claim 14, wherein the metal layer of the water barrier sheath is selected from Sn—Cu and Sn—Sb.

21. The power cable according to claim 14, wherein the metal layer of the water barrier sheath is selected from:

a Sn alloy that has a Sn content from 97%-99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; and a Sn alloy that has a Sn content from 93%-96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

* * * * *